United States Patent
Lüchinger et al.

(10) Patent No.: US 8,245,883 B2
(45) Date of Patent: Aug. 21, 2012

(54) DOSAGE DISPENSING DEVICE FOR POWDERS AND PASTES

(75) Inventors: Paul Lüchinger, Uster (CH); Sandra Ehrbar, Gutenswil (CH); Marc Zehnder, Volketswil (CH)

(73) Assignee: Mettler-Toledo AG, Greifensee (CH)

( * ) Notice: Subject to any disclaimer, the term of this patent is extended or adjusted under 35 U.S.C. 154(b) by 520 days.

(21) Appl. No.: 12/515,620

(22) PCT Filed: Nov. 23, 2007

(86) PCT No.: PCT/EP2007/062741
§ 371 (c)(1),
(2), (4) Date: May 20, 2009

(87) PCT Pub. No.: WO2008/068147
PCT Pub. Date: Jun. 12, 2008

(65) Prior Publication Data
US 2010/0051648 A1    Mar. 4, 2010

(30) Foreign Application Priority Data
Dec. 7, 2006 (EP) .................................. 06125585

(51) Int. Cl.
*G01F 11/00* (2006.01)

(52) U.S. Cl. ........ 222/226; 222/233; 222/235; 222/342; 222/360

(58) Field of Classification Search .................. 222/226, 222/227, 229, 233–236, 238, 239, 240, 241, 222/342, 359, 365
See application file for complete search history.

(56) References Cited

U.S. PATENT DOCUMENTS

| 4,793,525 | A  | 12/1988 | Kaufmann |
| 4,938,391 | A  | 7/1990  | Gründler |
| 5,145,009 | A  | 9/1992  | Mheidle et al. |
| 6,854,493 | B2 | 2/2005  | Ichikawa et al. |
| 7,760,104 | B2 | 7/2010  | Asp et al. |
| 2004/0045979 | A1 | 3/2004 | Macmichael |
| 2007/0006942 | A1 | 1/2007 | Pluvinage et al. |
| 2007/0080179 | A1* | 4/2007 | Brinz et al. ................... 222/412 |
| 2008/0185401 | A1 | 8/2008 | Luchinger |
| 2008/0190963 | A1 | 8/2008 | Luchinger et al. |
| 2008/0308579 | A1 | 12/2008 | Luechinger |

FOREIGN PATENT DOCUMENTS

| DE | 4447051  | A1 | 7/1996 |
| DE | 19841478 | A1 | 3/1999 |
| EP | 0234332  | A1 | 9/1987 |
| FR | 2607794  | A1 | 6/1988 |
| GB | 1459394  | A  | 12/1976 |
| WO | 95/18365 | A1 | 7/1995 |

* cited by examiner

*Primary Examiner* — Jason Boeckmann
(74) *Attorney, Agent, or Firm* — Standley Law Group LLP

(57) ABSTRACT

A dispensing head for a powder or paste dosage material has a housing with an outlet opening, a bearing- and passage area, and at least one socket connected to a source container. A feeder chute is formed inside the housing. A closure shaft is in the bearing- and passage area, free to rotate about and to slide along its central longitudinal axis. The closure shaft is connected to a closure element arranged near the outlet opening. Moving the closure shaft in the axial direction controls the volume flow of the dosage material through the outlet opening. A limit stop restricts the displacement of the closure shaft along its central longitudinal axis. In the feeder chute, an opposing stop defines the closed position where the limit stop rests in direct contact against the opposing stop and the outlet opening is closed off by the closure portion of the closure element.

17 Claims, 6 Drawing Sheets

US 8,245,883 B2

DOSAGE DISPENSING DEVICE FOR POWDERS AND PASTES

TECHNICAL FIELD

The present invention relates to a dosage-dispensing device for substances in powder- or paste form.

BACKGROUND OF THE ART

Dosage-dispensing devices of this kind find application in particular for the dispensing of small quantities of, e.g., toxic substances with high precision into small target containers. In many cases, such target containers are set on a balance which serves to weigh the substance quantity delivered from the dosage-dispensing device, so that it can subsequently be processed further in accordance with a set purpose.

The substance to be dispensed is contained for example in a source container which is equipped with a dispensing head. It is desirable to discharge the dosage material through a small opening of the dosage-dispensing device, so that it can be filled in a targeted stream into a container with a narrow fill opening.

Dosage-dispensing devices for dry and/or pulverous bulk materials, for example for pigments in powder form, belong to the known state of the art and are in practical use. As an example, a dosage-dispensing device is described in U.S. Pat. No. 5,145,009 A, which consists of a source container with a closable outlet at its underside. The function of a closure element is performed by a cone-shaped valve body whose diameter decreases in the upward direction, which can be moved vertically downward in order to open an outlet opening, which rotates while in its open position and is equipped with means for advancing the material in the direction of the outlet opening. The source container is further traversed by a closure shaft which protrudes from the top of the source container and can be coupled to a drive mechanism. The source container is connected at its underside to the dosage-dispensing device by way of an attachment flange. Several pressure cylinders are arranged to act on the lid of the source container, wherein the outlet opening and thus the delivery quantity from the source container can be influenced by way of the piston stroke. If strongly coagulating powders or substances in paste form are to be dispensed, it is of extraordinary importance for the closure shaft to be arranged in a vertical position, because the material flow in the container occurs in the vertical direction and is thus being assisted by the force of gravity.

For refilling, the dispensing head and source container can be removed together from the drive mechanism. However, due to the drive shaft being arranged in the source container, the refilling operation proves to be quite difficult, particularly when the materials being refilled are toxic substances or substances used for pharmaceutical preparations, where a contamination could represent a danger for the consumers of the pharmaceutical product.

As a way of countering this problem, a dosage-dispensing device is disclosed in EP 0 234 332 A1 which has a source container to whose underside a dispensing head is connected and to whose topside a drive mechanism is coupled. The source container further has a laterally protruding filler neck through which the source container can be filled. In this dosage-dispensing device, too, the drive shaft is arranged inside the source container.

The most serious problem area in the two foregoing solutions lies in the bearing- and passage area of the drive shaft. If dosage material enters into the bearing- and passage area, a dosage material with very hard particles can cause serious wear in the bearing. This can lead to a blockage of the drive shaft, and the abrasive wear creates the danger that abraded matter could contaminate the dosage material or that the precise operation of the dispensing head is compromised by an increasing amount of play in the bearing. A blockage of the drive shaft is particularly dangerous if it occurs in the opened state and the dosage material can pour out of the dispensing head into the surrounding area in an uncontrolled manner. Soft powders can be ground up to an ultra-fine consistency in the bearing and can escape uncontrollably through the bearing- and passage area to the outside and contaminate the environment.

In order to prevent the closure shaft from becoming blocked in the bearing- and passage area due to dosage material entering into the bearing, the bearing- and passage area in state-of-the-art solutions is arranged as far away as possible from the highest possible powder fill level. Further according to the state of the art, a variety of polymer sealing means are being considered for a protective seal. The limit for the powder fill level in devices with a lateral filler neck is determined by the location where the neck meets the container. These solutions result in a large overall height of the dosage-dispensing heads, which leads to a considerable overall height of the dosage-dispensing device and, accordingly, to instruments that are very expensive and unwieldy. Furthermore, elastic sealing means are very susceptible to erosion, can be attacked by solvents contained in the dosage material, and are therefore hardly a suitable choice for durable seals of a bearing- and passage area in which a drive shaft is supported in rotary and translatory movement.

In view of the problems of the dosage-dispensing devices and dispensing heads of the foregoing description, the present invention therefore has the objective to provide a dispensing head, or a dosage-dispensing device equipped with a least one such dispensing head, from which dosage material can be dispensed without the risk that the environment and/or the dosage material could become contaminated due to penetration of dosage material into the bearing- and passage area. A further objective of the invention is to provide a simple way in which the source container and the dispensing head together as a closed unit can be set into the drive mechanism as well as separated again from the latter after their contents have been dispensed.

SUMMARY

This objective is met by a dispensing head, or a dosage-dispensing device that includes said dispensing head, with the features specified in the independent patent claims.

A dispensing head for dosage material in the form of a powder or paste includes a housing which has an outlet opening, a bearing- and passage area, and at least one socket formed on, or connected to, the housing and serving to connect at least one source container to the dispensing head. Inside the housing, at least one feeder chute is formed which serves to connect the at least one socket to the outlet opening. Further, a closure shaft is held in the bearing- and passage area with the freedom to rotate about and to slide along its central longitudinal axis, and is connected to a closure element arranged in the area of the outlet opening. With an axial movement of the closure shaft and the closure element, the outlet opening is opened to a greater or lesser extent, whereby the volume flow of the dosage material through the outlet opening is controlled. The closure shaft has a limit stop which restricts the displacement of the closure shaft along its central longitudinal axis. In the feeder chute, an opposing stop is formed which serves to define the closed position in which the limit stop is seated solidly against the opposing stop and the outlet opening is closed off by the closure portion of the closure element. Formed on the limit stop and/or on the opposing stop is at least one recess, peeling edge, scraping edge, scraping surface, or cutting edge.

With this arrangement, a twofold benefit is achieved. First, by arranging a recess, peeling edge, scraping edge, scraping surface or cutting edge on the limit stop and/or on the opposing stop, the bearing- and passage area can be protected against the penetration of dust particles. As a result of the rotation and the linear movement, particularly in the closing phase, the dosage material which adheres to the closure shaft will in this arrangement continuously be peeled off and moved out of the bearing zone. Second, the closed position will be precisely defined and obtainable due to the presence of a limit stop and an opposing stop and due to the at least one recess, peeling edge, scraping edge, scraping surface, or cutting edge which serves to remove dosage material from the area between the limit stop and the opposing stop. The ability to reach the closed position is of the utmost importance to ensure that no dosage material can escape uncontrolled from the dispensing head.

The scraping element can be an edge that is formed by milling away a portion of the limit stop. Of course, it is also possible to arrange fine, spiral-shaped grooves on the surface of the limit stop and/or the surface of the opposing stop. As the rotating closure shaft causes a relative movement of the surface of the limit stop against the surface of the opposing stop, dosage material which is caught in between can be moved out of this area by the grooves, until the surface of the limit stop lies against the surface of the opposing stop. If both the limit stop and the opposing stop carry scraping edges, cutting edges or scraping surfaces with grooves, the circular segmentation of the grooves of the limit stop in relation to those of the opposing stop needs to be laid out in such a way that for example the raised portions of the opposing stop do not fit into the grooves of the limit stop. This prevents the possibility that the limit stop and the opposing stop could become engaged in each other, similar to a dog clutch, whereby the rotation would be blocked.

In order to allow a quick exchange of the dispensing head and to provide the highest possible level of safety against an unintended release of dosage material, the closure shaft is preferably force-biased by means of a spring which is seated in the housing. With the force of the spring, the closure element can also be held in the closed position when the dispensing head is not connected to the dosage-dispensing device and the closure shaft is not coupled to a drive shaft of the dosage-dispensing device. Thus, the closure portion automatically closes off the delivery opening, when the closure shaft is uncoupled from the drive shaft. This self-closing property of the dispensing head serves in particular as a safety measure in the handling of toxic substances, but it also prevents impurities from entering into the source container or into the dispensing head.

Even with the most accurate techniques being used in the production of the closure shaft, a certain degree of eccentricity of the individual shaft sections cannot be avoided. In order to wipe off even the finest particles and to keep the play between the closure shaft and the bearing- and passage area as small as possible, the bearing- and passage area can contain at least one seal ring which is arranged with the freedom to float in the radial direction relative to the housing and embraces the closure shaft with a sliding seat. The floating arrangement means that the seal ring is not rigidly embraces by the housing, but is seated with the freedom to move in a plane at right angles to the central longitudinal axis of the closure shaft. It is advantageous to arrange this seal ring between the housing and that end of the spring which points towards the housing. With the spring sitting against the seal ring, the axial play of the seal ring relative to the housing is eliminated, as the spring pushes the seal ring against the housing.

The central longitudinal axis of the closure shaft is preferably oriented vertical in the operating state, i.e. when the dispensing head is seated in the dosage-dispensing device. Furthermore, the central longitudinal axis of the at least one feeder chute is arranged at an acute angle to the central longitudinal axis of the closure shaft, with the width of the angle being more than 0° and less than 90°, and with the apex of the angle directed downward in the operating state of the device. By setting the feeder chute at oblique position, the dosage material can move from the source container to the outlet opening under the effect of gravity alone, as long as the acute angle is smaller than the angle of repose of the dosage material. Furthermore, the central longitudinal axis of the closure shaft runs outside of the at least one socket. This serves the purpose that the at least one source container, in its spatial arrangement in the operating state, is arranged at least partially to the side of the drive shaft and/or the closure shaft.

As a result of this configuration, the source container can be separated from the dispensing head, regardless of whether or not the dispensing head is still seated in the dosage-dispensing device. Consequently, it is possible to separate the source container from the dispensing head without the difficulty presented by a closure shaft that leads through the source container. However, as a matter of practicality, the unit consisting of the dispensing head and the source container is first taken out of the dosage-dispensing device and turned upside down, so that the outlet opening is pointing upward and, by shaking the unit, the remaining dosage material returns to the source container, whereupon the emptied dispensing head is separated from the source container. Due to the feeder chute being arranged at an acute angle to the closure shaft, the inside contours can be designed in such an advantageous way that, by this simple method, the dispensing head can be emptied without a problem before being separated from the source container.

In order to further facilitate this process, the outlet opening can be given a circular cross-section, and the closure element can be configured in a basically cylindrical shape. In the area of the closure element, there are thus no undercuts, crevices and corners created, where the dosage material could be held back.

Preferably, the closure element, which is configured in a basically cylindrical shape, has at least one closure portion which serves to close off the outlet opening, and a discharge portion which is arranged next to the closure portion and serves to deliver the dosage material to the outside. The discharge portion in this arrangement includes at least one surface depression recessed into the circumference of the cylinder. In this embodiment, the closure portion can be arranged, in reference to the operating position of the device, above and/or below the discharge portion.

Ideally, a cavity that is rotationally symmetric about the central longitudinal axis is formed in the housing to accommodate a stirrer device which is connected to the closure shaft. This cavity is arranged between the outlet opening and the feeder chute.

The stirrer device serves not only to loosen the dosage material and to prevent accumulations of stagnant material within the dispensing head. The stirrer device can also assist in moving the dosage material to the outlet opening, if it has at least one stirrer blade whose orbit about the central longitudinal axis of the closure shaft passes by the feeder chute, with the stirrer blade being set at a position that serves to shave off the dosage material of pulverous or pasty consistency which enters from the feeder chute into the cavity and to move said dosage material towards the central longitudinal axis and/or towards the outlet opening.

Depending on the mechanical properties of the dosage material, there can be considerable forces acting on the stirrer blade. The latter should therefore have a form-fitting connection to the closure shaft and/or the closure body in at least two places, to ensure that the stirrer blade is sufficiently protected against deformation. Furthermore, the stirrer blade can also be rotatably constrained in the housing by means of at least one stirrer blade bearing which is arranged in the housing. Preferably, the stirrer blade bearing, too, has at least one scraping edge, scraping surface or cutting edge, which has the effect that dosage material entering into the bearing can be removed from the latter as a result of the rotation.

So as not to compromise the above-described convenient way in which the dispensing head can be emptied, it is of advantage if the central longitudinal axis of the at least one feeder chute and the central longitudinal axis of the closure shaft intersect each other and the point of intersection is located in the area of the rotationally symmetric cavity.

With the source container filled up, since the fill level of the powder will lie above the bearing- and passage area relative to the operating position of the device, the bearing- and passage area will be under a kind of hydrostatic pressure, whereby the particles of the dosage material are pushed into the bearing- and passage area. This pressure is in essence dependent on the consistency and the particle size of the dosage material. The pressure can be counteracted in part with a design where a dome is formed in the housing that is rotationally symmetric about the central longitudinal axis of the closure shaft and points towards the bearing- and passage area. The dome has the effect of keeping the bearing- and passage area out of the direct mass flow of the dosage material, which has the consequence that a smaller number of very small particles that are present in the dosage material are directed past the bearing- and passage area, which lowers the probability that these very small particles could enter into the bearing- and passage area.

As a way to minimize the risk of contamination of the dosage material or of the ambient environment and to increase the shelf life of the dosage material or, if the dispensing head has more than one feeder chute and socket for source containers, one or more, or all, of the feeder chutes can be equipped with a shutter element which can be actuated from the outside. This allows individual source containers to be switched on. Of course, the shutter element can also serve to control the flow velocity in the feeder chute, or it can represent an additional possible closure device if the dosage material is to be stored in the source container with the dispensing head attached. With a suitable pairing of materials and design choice, for example as a rotary slide shutter, it is even possible to achieve a gas-tight storage of the dosage material inside the source container. The housing can also have at least one gas supply port which is connected to the feeder chute by way of a gas-permeable connection. The gas-permeable connection can consist of at least one bore hole and/or a gas-permeable diaphragm. With a suitable design, this diaphragm prevents particles of the dosage material from entering into the gas supply port. With an appropriate configuration, the delivery rate at the outlet opening can be influenced through the injection of gas. Furthermore, the injection of gas can also serve to whirl up the dosage material in order to minimize the coagulation of the dosage material or adhesion of the dosage material to the walls of the feeder chute and the source container.

The gas supply port can also be used to bring an inert gas into the source container as a means to extend the storage life of the dosage material. Depending on the properties of the inert gas (i.e., depending on whether it is lighter or heavier than the medium being displaced by it), the supply connection can be arranged between the shutter element and the outlet opening or between the shutter element and the socket. With the latter arrangement, the gas supply port could also serve to generate a vacuum inside the source container and/or inside the dispensing head. Furthermore, the housing can include an additional hollow space with a gas-permeable connection to the feeder chute, wherein the additional hollow space is filled with a moisture-absorbing substance, for example silica gel or a molecular sieve.

Dosage material in paste form with low viscosity, or powder with a high degree of pourability, can have a strong influence on the precision of the dosage-dispensing device, due to the lowering of the fill level in the source container during the dispensing process. As a means to compensate for the influence that the fill level has on the dosage-dispensing process, the at least one feeder chute can have a constriction that serves to influence the flow velocity of the dosage material. This constriction can for example have the internal contour profile of a Venturi nozzle, but it could also be a diaphragm shutter, a sieve insert or the like.

Especially the use of one or more sieves in the feeder chute can have very many advantages. With the sieve, large lumps are held back in the source container. On the one hand, this prevents clogging in the area of the outlet orifice, and it ensures on the other hand that only particles up to a given size are being dispensed. If suitable means such as a vibration generator are used to break up these lumps, the sieve helps to split up the lumps. If sieves with graduated perforation sizes are arranged in series, the dosage material in the feeder chute will be sorted according to particle size, so that the smallest particles can be dispensed first. After they have been dispensed, the sieve insert with the smallest perforations can for example be swiveled away or pulled out laterally, analogous to the shutter element. This opens the way for the next larger particles, so that they can be dispensed. These steps can be continued with the other sieves until all particles that are smaller than the maximum aperture cross-section of the outlet opening have been discharged.

In order to reduce the number of sieve inserts, it is also possible to arrange two sieve inserts next to each other in the feeder chute which can be turned, swiveled or slid relative to each other. With this arrangement, which has a large number of aperture-adjustable passage openings, the maximum particle size to be dispensed can be selectively adjusted from zero up to the maximum aperture of the sieve perforations. Particularly simple and space-saving are arrangements in which the size of the passage openings can be set by rotating the sieve inserts relative to each other.

So as not to be limited to a single design for the kinds of source containers that can be connected to the dispensing head, or in order to be able to use a broad range of different source containers with differently dimensioned connections, the socket can be connected to differently configured intermediate flanges serving as adapters.

In order to facilitate the handling of the source containers when setting them into or taking them out of the drive mechanism, the drive shaft and the closure shaft in the operation-ready state of the dosage-dispensing device are preferably aligned along a common central longitudinal axis. This allows the drive mechanism to be coupled to, or uncoupled from, the closure shaft through a simple linear movement of the drive shaft. This also makes it possible to use the broadest selection of coupler types with profile engagement or contact force engagement, such as dog clutches, friction clutches and the like.

The central longitudinal axis of the source container, when the latter is connected to the dispensing head, can in principle be oriented at an arbitrary angle relative to the central longitudinal axis of the closure shaft. However, depending on the orientation of the central longitudinal axis, the source container may have to be equipped with additional feeder elements, such as for example feed screws, to cause the dosage material to enter the feeder chute. To avoid the need for such additional feeder elements, the angle is preferably selected so that when the dispensing head is seated in the drive mechanism, pourable dosage material can be moved by gravity to the outlet opening of the dispensing head. Of course, in these embodiments there can likewise be additional feeder means arranged in the source container, particularly if strongly coagulating dosage material is to be moved from the source container through the feeder chute to the outlet opening.

In a first preferred embodiment, with the source container connected to the dispensing head, the central longitudinal axis of the at least one source container and the central longitudinal axis of the associated at least one feeder chute intersect in a point in the area of the socket or the intermediate flange, while the angle between the two central longitudinal axes can be of an arbitrary magnitude.

In a second preferred embodiment, with the source container connected to the dispensing head, the at least one source container and the associated at least one feeder chute have a common central longitudinal axis.

In a third preferred embodiment, with the source container connected to the dispensing head, the central longitudinal axis of the closure shaft and the central longitudinal axis of the source container are arranged parallel to each other.

It has been shown that the flow of dosage material to the outlet opening is facilitated particularly if round aperture cross-sections are used, as this will minimize the surface area of contact between the dosage material and the internal contours of the dispensing head while it maximizes the passage cross-section. Consequently, the feeder chute preferably has an oval or circular cross-section in a plane that extends perpendicular to the central longitudinal axis of the feeder chute.

In a further embodiment, the source container has a tubular body, at whose first opening a fastening flange is formed which fits the socket or the intermediate flange, and whose second opening is configured as a closable fill opening. This kind of source container can be refilled again without having to be disconnected form the dispensing head. However, for delicate dosage material, for example toxic or very expensive substances, it is preferable to use source containers that have only one opening through which the source container can be connected to the socket or the intermediate flange of the dispensing head.

If dosage material is to be dispensed only sporadically and the unit of dispensing head and source container is to be used also as a storage container, it is advantageous if the dispensing head and/or the source container carries an identification mark or has a sender/receiver unit with a data storage module and if a read/write device—arranged separately from the dispensing head and the source container—is available to the user. Through physical connections or wireless transmission, data can be exchanged between the read/write device and the data storage module. Particularly suitable for this purpose is for example an RFID tag with a compatible read/write device. However, a simple barcode or matrix code on the source container or dispensing head can also serve as identification for the dosage material and can be registered by a barcode reader or a camera.

In order to facilitate the assembly and to place the RFID tag or identification mark inside the housing for protection, the housing of the dispensing head is preferably subdivided into an outer part and an insert unit. At least the bearing- and passage area is formed on this insert unit. Before the insert unit is installed in the outer part, it can be fitted with the closure shaft, the closure element, the stirrer element (if applicable), and the identification mark or the sender/receiver unit with the data storage module. If an identification mark is used, the outer part at least in the area of the mark is made of a transparent material. Ideally, the entire housing is made is made of a transparent material, so that it is easy to see from the outside whether, and how much, dosage material is left in the dispensing head. The transparent housing could also have a graduated fill-level scale if desired.

As has already been described above in detail, at least one dispensing head according to the invention can be rigidly connected to at least one drive mechanism in a dosage-dispensing device for dosage material in the form of a powder or paste, and the closure shaft of the at least one dispensing head can be coupled by way of at least one clutch to the drive shaft of the at least one drive mechanism. In the operating state, the dispensing head is arranged below a drive unit of the drive mechanism. The outlet opening of the dispensing head is preferably pointing downward in the operating state, while the bearing- and passage area is facing upward, with the central longitudinal axis being oriented essentially vertical in the operating state.

BRIEF DESCRIPTION OF THE DRAWINGS

Details of the dispensing head according to the invention and the dosage-dispensing head according to the invention will become apparent from the description of the examples of embodiments, wherein.

DETAILED DESCRIPTION

Figure 1:
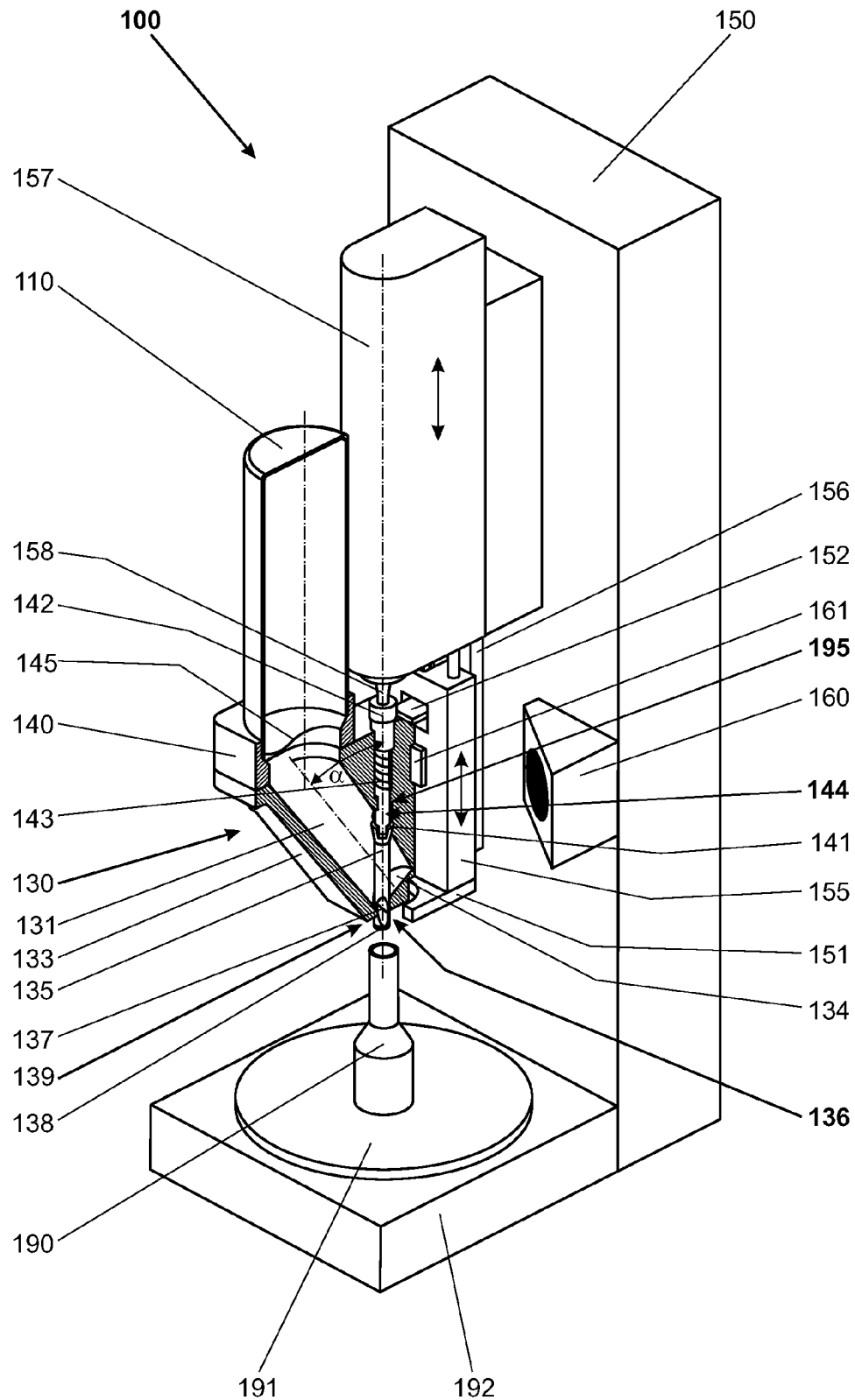
FIG. 1 represents a dosage-dispensing device in three-dimensional view with a dispensing head of a first embodiment set in place in the drive mechanism, and with a source container which is connected to the dispensing head, wherein the dispensing head and the source container are shown in sectional view and the central longitudinal axes of the closure shaft and the source container are arranged parallel to each other.

FIG. 1 shows a dosage-dispensing device 100 having a drive mechanism 150 in which a dispensing head 130 can be set in place and subsequently removed again. A source container 110 is releasably or solidly connected through a socket 140 to a source container 110. Arranged between an opening 145 of the socket 140 and an outlet opening 139 in the housing 133 of the dispensing head 130, a feeder chute 131 is arranged through which dosage material can move from the source container 110 to the outlet opening 139. This feeder chute 131 is of cylindrical shape and has a flat end surface 134, wherein the outlet opening 139 is arranged at the lowest point of the feeder chute 131 (when the dispensing head 130 is installed in the drive mechanism 150), so that in the operating state of the dosage-dispensing device, the dosage material is channeled under the effect of gravity by the feeder chute walls to the outlet opening 139. Before connecting the source container 110 to the dispensing head, the source container 110 is filled with dosage material. The assembly is performed in the upside-down position, meaning that the outlet opening 139 of the dispensing head 130 and the opening of the source container are held in the reverse of their operating position during the operation of connecting the dispensing head and the source container.

The housing 133 of the dispensing head 130, when the latter is seated in the drive mechanism 150, is pushed by a second holder element 152 against the first holder element 151 and thus held captive in the drive mechanism 150. The two holder elements 151, 152 are components of a seating device 155 which is connected to the housing of the drive mechanism 150 by way of a vertically oriented linear guide 156 and is therefore height-adjustable, so that when the dispensing head 130 is seated in the drive mechanism 150, target containers 190 of different lengths can be set up below an outlet opening 139 of the dispensing head 130. Arranged above the seating device 155 is a drive unit 157 which has a drive shaft 158. The drive unit 157 or at least the drive shaft 158 can be moved vertically up and down relative to the seating device 155. The housing 133 of the dispensing head 130 has a bearing- and passage area 144 in which a closure shaft 135 is constrained with the freedom of rotation and linear movement along its central longitudinal axis. A limit stop 141 and an opposing stop 195, whose function will be discussed in detail in the description of FIGS. 2 to 6d, are formed, respectively, on the closure shaft 135 and on the housing 133.

The central longitudinal axis of the closure shaft 135 is arranged at an acute angle α relative to the central longitudinal axis of the feeder chute 131, with the apex of the acute angle α pointing essentially towards the outlet opening 139. After the dispensing head 133 has been seated in the drive mechanism 150, more specifically in the seating device 155, the closure shaft 135 can be coupled to the drive shaft 158 by means of a clutch 142. Of course one could use any of the known clutches with profile engagement or contact force engagement of a design where the clutch halves can be separated from each other in a simple way. However, as an important criterion in the selection of the clutch, there should be no slippage between the clutch halves during a normal dispensing operation because, depending on the dispensing method, this could compromise the operating precision of the dosage-dispensing device 100.

At the shaft end that points towards the outlet opening 139, the closure shaft 135 carries a closure element 136 which has a cylindrical closure portion 138 and, arranged next to it, a delivery portion 137. The closure element 136 reaches into the outlet opening 139 which is formed in the housing 133. When the delivery portion 138 is positioned in the outlet opening 139, the dosage material can be delivered to the outside through the aperture which is delimited by the contour of the delivery portion 138 and the perimeter of the outlet opening 139. Furthermore, the closure shaft 135 is elastically biased by the force of a spring 141, so that when the closure shaft 135 is disengaged from the drive shaft 158, the closure portion 138 will automatically be returned to the outlet opening and/or be held in place in the outlet opening.

The target container 190 rests on the load receiver 191 of a balance 192 which is electronically connected to the control- and regulation electronics of the drive mechanism 150. FIG. 1 further shows a sender/receiver unit 161 with a data-storage module, and/or an identification mark, which is arranged in or on the housing 133 of the dispensing head 130 and whose data are registered by a reader device or which is capable of communicating with a read/write device 160. This feature can be a barcode or matrix code which can be registered by a camera, or it can be a data storage module which is connected to the electronic controls of the dosage-dispensing mechanism 100 either through electrical connections or through a wireless connection, for example in the manner of an RFID tag.

The source container 110 shown in FIG. 1 is basically of a cylindrical shape. However, in principle other shapes would also be possible for the source container, for example with a square, hexagonal or octagonal internal or external profile.

As shown in FIG. 1, with a suitable design of the socket 140, the central longitudinal axis of the source container 110 is arranged parallel to the central longitudinal axis of the closure shaft 135. However, this does not mean that the source container 110 absolutely has to be arranged vertically. The central longitudinal axis of the source container 110 can have any desired orientation relative to the central longitudinal axis of the closure shaft 135 and/or the central longitudinal axis of the feeder chute 131, as long as the arrangement allows a continuous passage from the source container 110 through the feeder chute 131 to the outlet opening 139. If in the operating state, the socket 140 is located above the lowest point of the source container 110, it will be necessary to provide additional conveying means in the source container 110 in order to allow the dosage material to move into the feeder chute 131. The operating state of the dosage-dispensing device 100 in relation to the mechanical components has been established if the dispensing head 130 is seated in the drive mechanism 150, the closure shaft 135 is coupled to the drive shaft 158, and a source container 110 is connected to the dispensing head 130.

To the extent that the components shown in the following drawing figures are identical to those in FIG. 1, the same reference symbols will be used, and the description of those parts in the preceding drawings will likewise be applicable.

Figure 2:
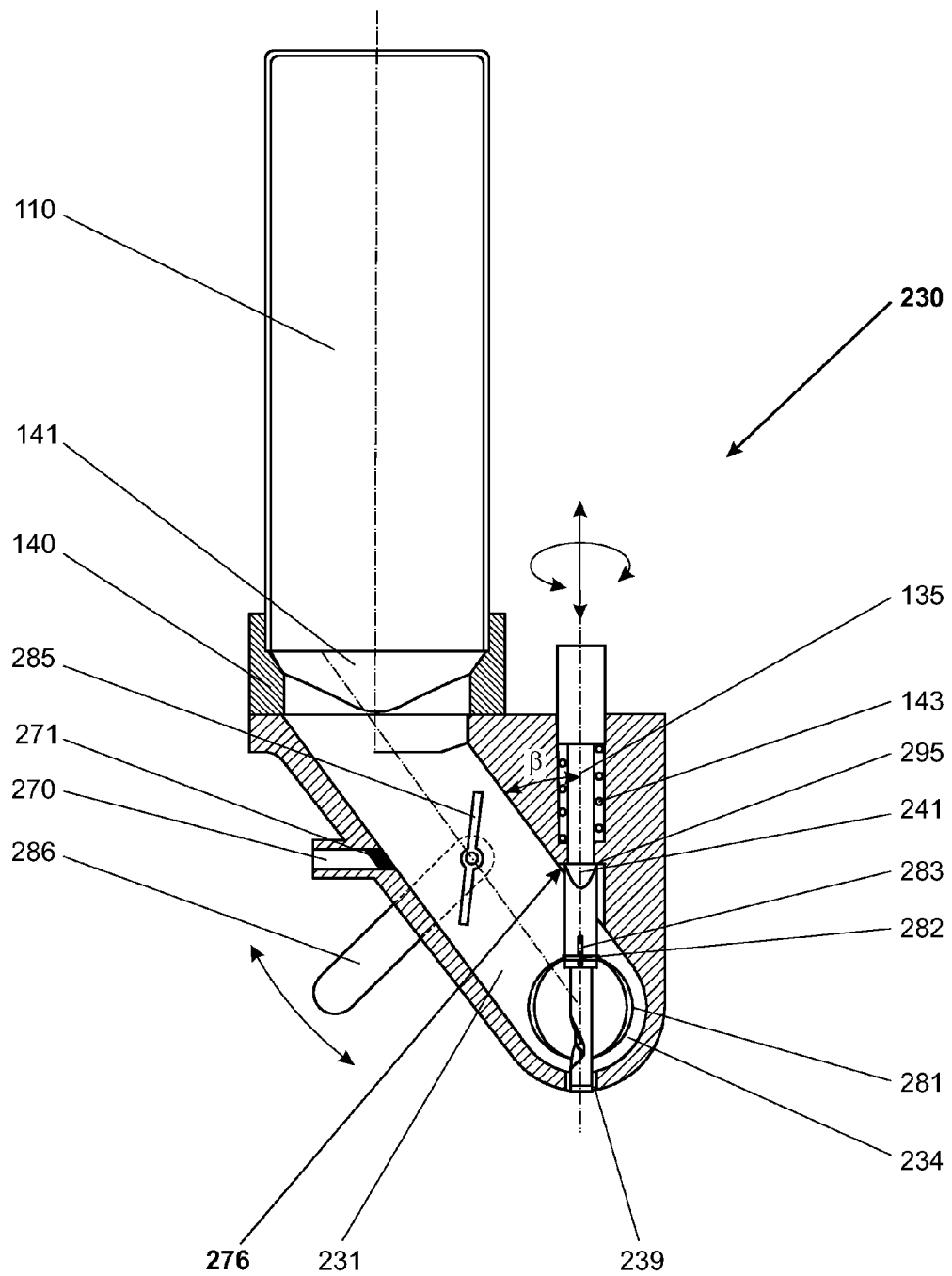
FIG. 2 represents a dispensing head of a second embodiment shown in a plane section, with a source container that is connected through an intermediate flange to the dispensing head, also a first stirrer device, and a schematically illustrated shutter element which is arranged in the feeder chute, and a gas supply port into the feeder chute.
Figure 3:
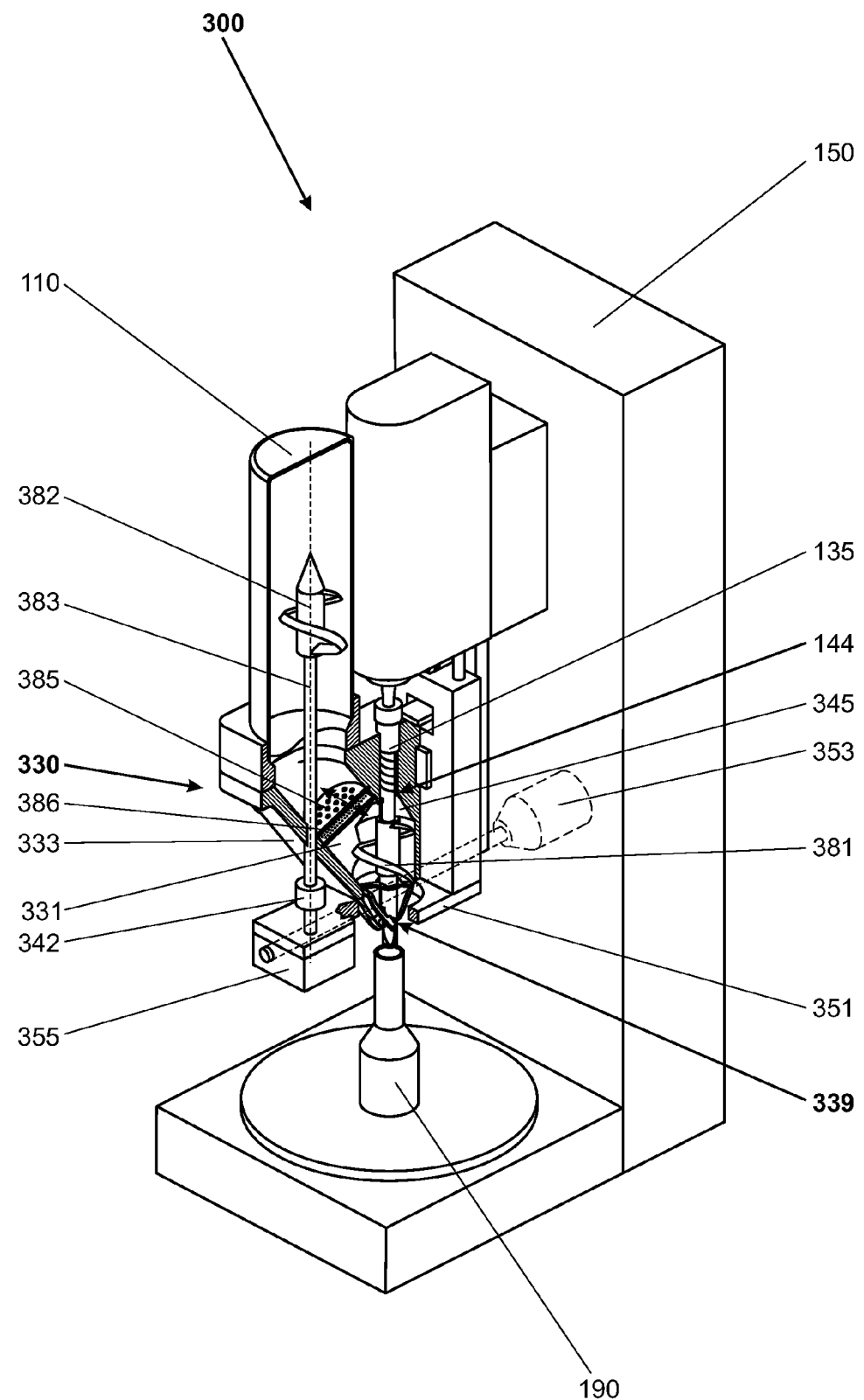
FIG. 3 shows the drive mechanism of FIG. 1 in a three-dimensional view, with a dispensing head set in place in the drive mechanism of a third embodiment, with a first stirrer device and with a source container connected to the dispensing head, wherein the dispensing head and the source container are shown in sectional view and a second stirrer device is arranged in the source container.

FIG. 2 represents a dispensing head 230 of a second embodiment in a plane section, with a source container 110 that is connected through an intermediate flange 140 to the dispensing head 230. As in FIG. 1, the source container 110 is connected to the outlet opening 239 by way of an opening 145 in the intermediate flange and a feeder chute 231. Instead of a flat end surface like the feeder chute shown in FIG. 1, the feeder chute 231 in FIG. 2 has a spherically shaped end surface 234. This allows a first stirrer device 281 to be used, as the spherical end surface 234 offers a rotationally symmetric free space in relation to the central longitudinal axis of the closure shaft 135. The stirrer device 281 is held with linear mobility on the closure shaft 135 by way of a guide ring 282. This allows linear up- and down movement of the closure shaft 135 without causing the stirrer device 281 to be pushed against the wall of the feeder chute 231. The closure shaft 135 carries a groove 283 which engages the guide ring 282 and thereby transmits the rotary moment to the stirrer device 281.

Figure 6A:
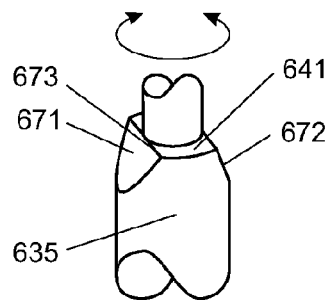
FIG. 6a represents a three-dimensional view of a first embodiment of the limit stop formed on the closure shaft, with two material portions removed by milling.
Figure 6B:
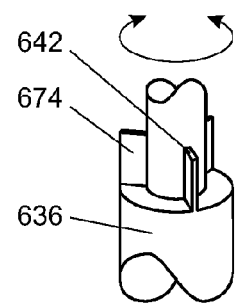
FIG. 6b represents a three-dimensional view of a second embodiment of the limit stop formed on the closure shaft, with three material portions removed by milling.
Figure 6C:
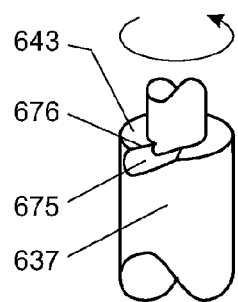
FIG. 6c represents a three-dimensional view of a third embodiment of the limit stop formed on the closure shaft, with a groove.

As has already been described in the context of FIG. 1, the closure shaft 135 is force-biased in one direction by a spring 143, so that after the dispensing head 230 has been taken out of the drive mechanism, the closure element is held securely in the outlet opening 239, whereby the latter is closed off. For a positive definition of the closed position, the closure shaft has a limit stop 241 which is pushed by the biasing force of the spring 143 against an opposing stop 295 that is formed in the feeder chute 231, so that upon reaching the closed position, the limit stop 241 is in solid contact with the opposing stop 295. As soon as the desired target quantity of dosage material has been received by the target container, it should be possible to securely close the outlet opening 239. Since dosage material can become stuck between the limit stop 241 and the opposing stop 295, there is a risk that the dosage material caught between the stops may prevent the complete closing of the outlet orifice 239. The limit stop 241 is therefore given a suitable shape which, by means of the rotation of the closure shaft 295, serves to remove the dosage material trapped between the limit stop 241 and the opposing stop 295. As the chute wall is inclined at an acute angle β to the central longitudinal axis of the closure shaft, a peeling edge 276 is formed in the area of the opposing stop 295. This peeling edge 276 has the purpose that the dosage material which adheres to the closure shaft 135 is peeled off when the closure shaft 135 moves along its central longitudinal axis during a closing phase. To illustrate the peeling edge 276 more clearly, the recess for the opposing stop in 295 is shown very large in FIG. 2. However, as a practical solution, the recess tightly embraces the closure shaft 135, in order to achieve a better peeling effect. Three design possibilities for the limit stop 241 are illustrated in FIGS. 6a to 6c and will be described in detail farther below.

FIG. 2 further shows in schematic representation a shutter element 285 which can be opened or closed by way of an actuating element 286 which is likewise represented schematically. The shutter element 285 can be configured according to a conventional design such as a spigot, a rotary slide, a linear slide and the like. The shutter element 285 can have multiple functions. It can serve to throttle the flow of dosage material, or also to form a gas-tight closure for the dosage material against the outside, if the unit consisting of the source container 110 and the dispensing head 230 is to be used simultaneously as storage- and transport container for the dosage material. When using the unit for the latter purpose, the dosage material which is present in the feeder chute 231 should first be shaken back into the source container 110, before the shutter element is closed.

Dosage material which reacts to ambient factors such as humidity needs to be handled appropriately for its storage. The feeder chute 231 can therefore be additionally equipped with a gas supply port 270 as shown here schematically, which is protected by a gas-permeable diaphragm against the penetration of dosage material. With the gas supply port 270, the interior of the source container 110 and of the dispensing head 230 can be flooded with an inert gas, whereby the entry of another gaseous medium, for example air, can be prevented. Of course, it is also possible to introduce a reactive gas into the dosage material, for example in order to neutralize residues of a dosage material harmful to the environment and thereby to decontaminate the empty source container 110 and the dispensing head 230. Of course, the diaphragm 271 can also be designed in such a way that fluids can be introduced into the feeder chute 231 in order to flush out the dispensing head 230. Prior to delivering the dosage material to the outside, the gas exposure could be enhanced by the rotation of the stirrer device 281. With a suitable design of the gas supply port, the gas entering into the feeder chute 231 can also facilitate the movement of pulpy or sticky dosage material in the feeder chute 231 or the passage of the dosage material through the outlet opening 239.

FIG. 3 illustrates a dosage-dispensing device 300 which includes the drive mechanism 150 of FIG. 1, shown here in a three-dimensional view and, seated in the drive mechanism, a dispensing head 330 shown in a sectional view. As in FIG. 1, the dosage-dispensing device in FIG. 3 is likewise shown in its operating state with the outlet opening 339 opened. In this position, dosage material can move through the outlet opening 339 into the target container 190.

To provide enough free space for a larger stirrer device 381, so that it can rotate together with the closure shaft 135 about the central longitudinal axis of the latter, a part of the interior space of the housing 333 is shaped like a dome 345 which extends towards the bearing- and passage area 144.

This dome 345 gives additional protection to the bearing- and passage area against the penetration of dosage material, as the bearing gap between the closure shaft 135 and the housing 333 does not end directly in the feeder chute 331, so that the bearing gap is not exposed to direct contact with the dosage material flowing through the feeder chute 331. The stirrer blades of the second stirrer device 381 are designed in such a way that the dosage material is peeled out of the feeder chute 331 and moved towards the closure shaft 135 and the outlet opening 339.

Arranged in the feeder chute 331 are a first sieve insert 385 and a second sieve insert 386 with linear mobility orthogonal to the central longitudinal axis of the feeder chute 331. The sieve inserts 385, 386 have a plurality of perforations, wherein the aperture size of the individual perforations decreases towards the outlet opening 339. As a result of this configuration, the particle size of the dosage material can be selected during the dispensing process. With the possibility of sliding the sieve inserts 385, 386 at a right angle to the central longitudinal axis of the feeder chute 331, the individual particle size categories can be selected in ascending order. By pulling one of the sieve inserts 385, 386 partially or totally out of the feeder chute 331, the passage through the feeder chute in the area of the pulled-out sieve insert is freed up for all particle sizes. In addition, this arrangement allows the sieve inserts 385, 386 to be exchanged or to be taken out for cleaning. Obviously, one could also use more than two sieve inserts, or only one sieve insert.

Particularly to enable sticky or pulpy dosage material to move from the source container 110 through the feeder chute 331 to the outlet opening without remaining stuck, there can be a second stirrer device 382 arranged in the source container.

The second stirrer device is connected to the stirrer shaft 383 which is rotatably constrained in the housing 333. The stirrer shaft 383 is connected by way of a clutch 342 to the output shaft of an angle-changing gearbox 355. The angle-changing gearbox 355 is connected to the first holder element 351 which, in order to serve this purpose, is longer than the first holder element 151 shown in FIG. 1. The input shaft of the angle-changing gearbox 355 is connected to a motor 353 which is outlined schematically in FIG. 3. Of course, other concepts of a drive source for the second stirrer device 382 are also conceivable. For example, instead of the angle-changing gearbox 355, the motor 353 could also be connected directly to the stirrer shaft 383.

Figure 4:
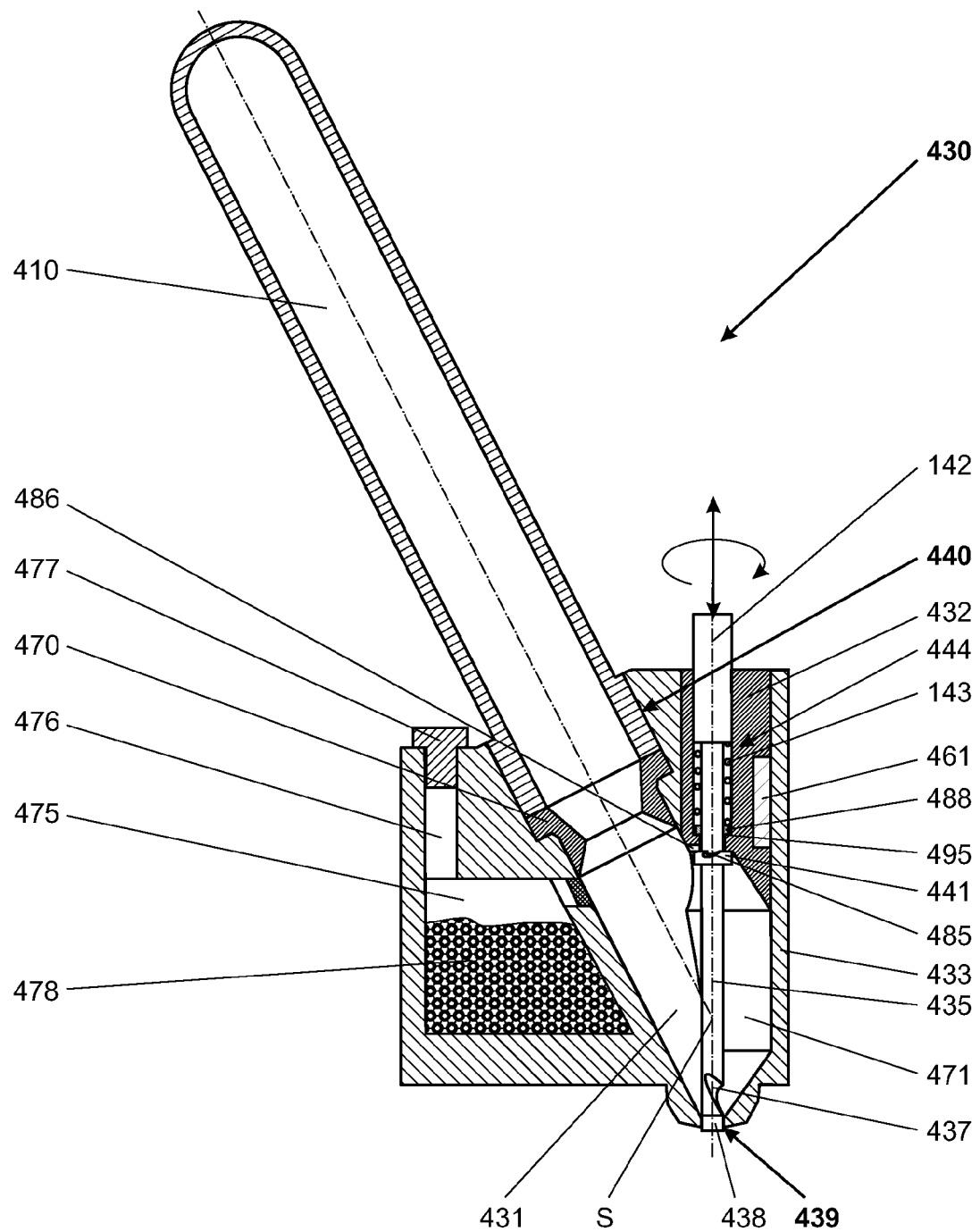
FIG. 4 illustrates a dispensing head of a fourth embodiment shown in a plane section, with a source container that is connected directly to the dispensing head, wherein the central longitudinal axes of the feeder chute and the source container coincide with each other, and wherein the feeder chute has a constriction, further with an additional hollow space in the housing of the dispensing head, wherein said hollow space is connected to the feeder chute and is filled with a moisture-absorbing substance.

FIG. 4 illustrates a dispensing head 430 of a fourth embodiment in a plane section. The dispensing head 430 has a housing which is subdivided into an outer part 433 and an insert unit 432. A feeder chute 431 is formed in the outer part 433. In addition, a socket 440 is formed on the outer part 433, so that the outer part 433 and the socket 440 are configured as one piece. A source container 410 is directly connected to the socket 440, with the source container 410 and the feeder chute 431 having a common central longitudinal axis. A closure shaft 435 is held with rotary and linear mobility in a bearing- and passage area 444 which is formed in the insert unit 432. Between the bearing- and passage area 444 and an outlet opening 439, a rotationally symmetric cavity 471 is formed to accommodate, if necessary, a stirrer device which can be connected to the closure shaft 435. As in the preceding figures, the feeder chute 431, more specifically the walls of the chute, are arranged at an acute angle to the closure shaft 435, with the central longitudinal axes intersecting each other in a point S which is arranged in the area of the rotationally symmetric cavity 471. Also analogous to the drawing figures described previously, the closure shaft 435 terminates in the closure portion 438, while the delivery portion 437 is arranged closer to the clutch 142. When the closure shaft 435 is uncoupled from the drive shaft of the dosage-dispensing device, a spring 143 pushes a limit stop 441 which is formed on the closure shaft against an opposing stop 495 which is formed on the insert unit 432. The stops 441 and 495 are matched to the closure portion 438 and the outlet opening 439 in such a way that when the stops 441 and 495 are in solid contact against each other, the outlet opening 439 is closed up by the closure portion 438. As a means to continuously scrape off dosage material which adheres to the closure shaft 435 and to ensure a complete closure, a groove 485 is formed on the limit stop 441, and a recess 486 is formed on the opposing stop 495. As a result of this configuration, the rotation of the closure shaft 435 causes the dosage material accumulated between the stops 441, 495 to be moved away in the radial direction from the bearing gap between the closure shaft 435 and the bearing- and passage area 444.

In order to prevent particles of the smallest size from entering into the bearing- and passage area 444, a seal ring 488 is arranged in a floating position between the spring 143 and the insert unit 432. Thus, the spring 143 is seated on the seal ring 488 rather than directly on the insert unit 432. The internal diameter of the seal ring 488 is matched to the shaft diameter of the closure shaft 435, so that there is a tightly toleranced sliding contact between the two parts. The play which exists in the sliding contact is so small that even the finest particles are prevented from entering. The external diameter of the seal ring 488 is kept clearly smaller than the internal diameter of the stepped bore hole of the bearing- and passage area 444. Due to its floating arrangement relative to the insert unit 432, the seal ring 488 is free to follow the radial excursions of the closure shaft 435 which can occur as a result of manufacturing-related eccentricities, bent shafts and elastic deformations of the closure shaft 435 and the bearing- and passage area 444. The axial play of the seal ring 488 relative to the insert unit 432 is canceled by the biasing force of the spring 143.

There is further a constriction 470 arranged in the feeder chute 431, which serves to prevent that very free-flowing dosage material could stream too rapidly into the target container during the dispensing process. As a result of this measure, the control- and regulation unit of the dosage-dispensing device can be given sufficient time to react. The housing 433 further contains a hollow space 475 which, by way of a fill opening 476, is filled with a moisture-absorbing substance 478. The fill opening 476 is hermetically closed up with a stopper 477. The hollow space is connected to the feeder chute by way of a gas-permeable connection. With this arrangement, moisture can be removed from the dosage material or can be prevented from entering and causing the formation of lumps in the dosage material.

In order to facilitate the assembly of the dispensing head and to sufficiently protect the sender/receiver unit with the data storage module 461 against damage and manipulation, a space can be formed in the insert 432, as shown in FIG. 4, to accommodate the sender/receiver unit with the data storage module 461.

Figure 5:
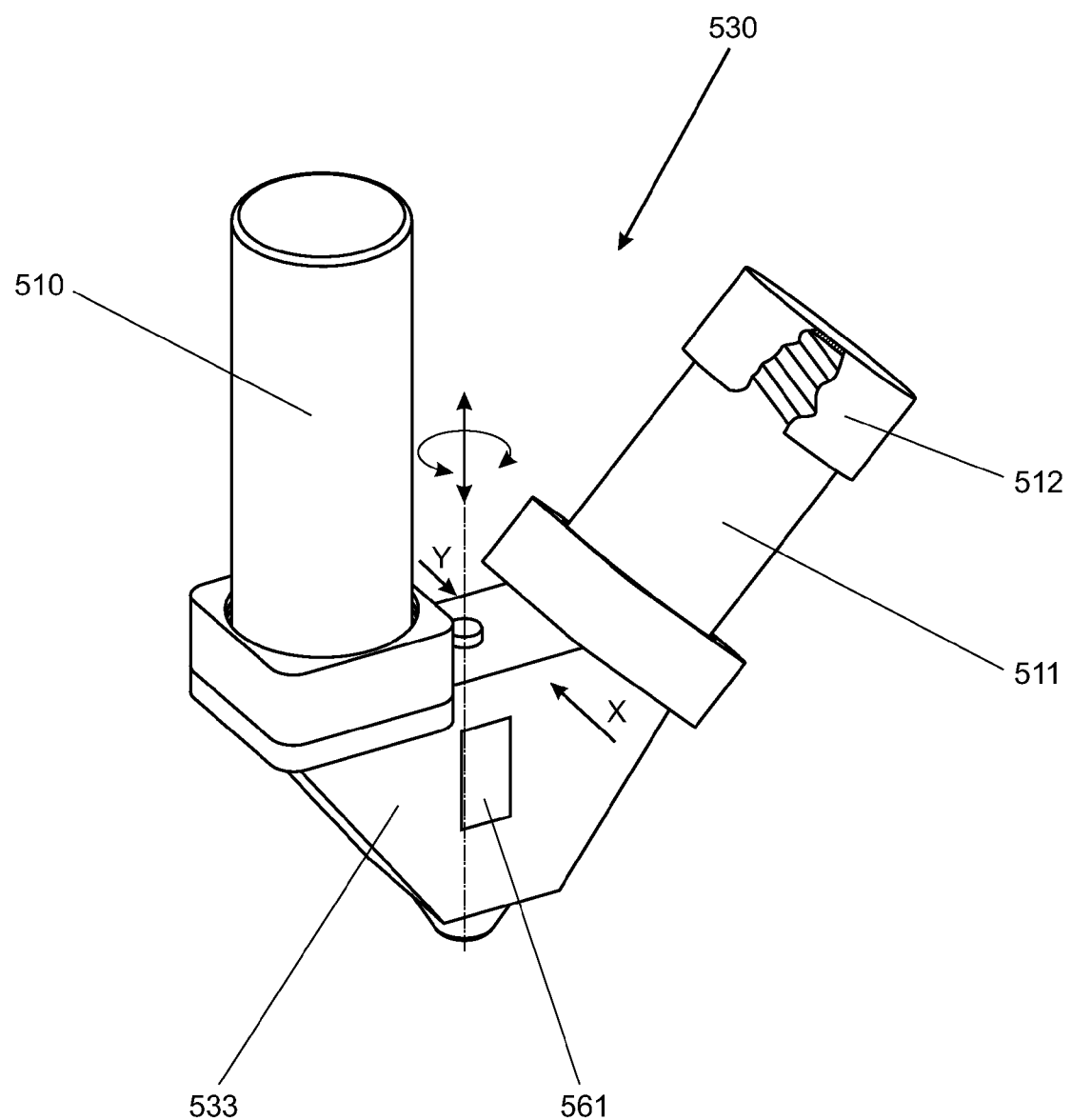
FIG. 5 shows a dispensing head of a fifth embodiment in three-dimensional view, with two source containers of different length and configuration.

FIG. 5 shows a dispensing head 530 of a fifth embodiment in three-dimensional view, with a first source container 510 and a second source container 511. Except for the fact that there are two feeder chutes, the configuration inside the housing is analogous to one of the preceding examples of dispensing heads in FIGS. 1 to 4, or it can have any combination of the individually described features of those examples. Obviously, the dispensing head 530 with the two source containers 510, 511 can be set into the drive mechanism in only two different orientations, unlike the previously described dispensing heads of FIGS. 1, 2 and 4, which can in principle be connected to the drive mechanism in three different orientations. The arrows X and Y indicate the seating contact surfaces of the housing 533, only one of which lies against the seating device. When the dispensing head 533 is seated in the drive mechanism, the sender/receiver unit 561 occupies the same position as the sender/receiver unit 161 which is shown in FIG. 1. Of course, configurations with more than two source containers per dispensing head are also conceivable.

To allow source containers to be refilled also when the dispensing head is seated in the drive mechanism, the second source container 511 has as closure cap 512 at the end that faces away from the dispensing head 533. Of course, the source containers in all of the previously described examples could likewise have a closure cap 512 for the purpose of filling or refilling. If the dispensing head is equipped with shutter elements in the feeder chutes, as shown in FIG. 2, the individual source containers can be switched on and off in any way desired.

Figure 6D:
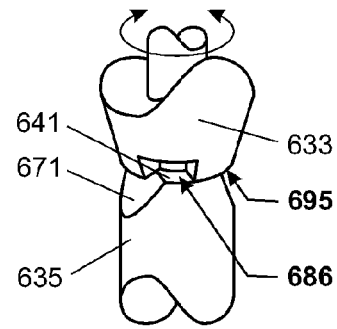
FIG. 6d represents a three-dimensional view of a part of the bearing- and passage area, with a cutout at the opposing stop, combined with the first embodiment of the limit stop of FIG. 6a which is formed on the closure shaft shown here installed in the bearing- and passage area.

FIGS. 6a to 6c are three-dimensional illustrations of different embodiments of the stop that is formed on the closure shaft. FIG. 6d shows a possible configuration of an opposing stop in connection with the embodiment of a limit stop that is shown in FIG. 6a.

In FIG. 6a, the limit stop 641, more specifically its contact surface, is reduced by a first milled-away portion 671 and a second milled-away portion 672. This creates open spaces and two scraping edges 673 in the area of the limit stop 641, whereby dosage material that is trapped between the limit stop 673 and the opposing stop shown in FIG. 2 can be removed. This effect is enhanced by the rotation of the closure shaft 635, whereby a relative movement of the limit stop 641 against the stationary opposing stop is generated. Of course, configurations with only one milled-away portion 671 or more than two milled-away portions 671, 672 are also possible.

A second example of an embodiment is shown in FIG. 6b. The contact surface of the limit stop 642 formed on the closure shaft 636 has been reduced to three thin blades. As the scraping surfaces 674 are in this case vertical, the operating reliability is considerably increased in comparison to the embodiment shown in FIG. 6a. The required contact surface depends on the maximum permissible surface pressure between the limit stop and the opposing stop and on the force exerted by the spring of FIG. 2. The embodiments of FIG. 6a and of FIG. 6b are functioning independently of the sense of rotation. Of course, with this concept, too, it is possible to have only one blade or several blades.

The contact surface of the limit stop 643 of the closure shaft 637 shown in FIG. 6c has a groove 675. As a result of the groove 675, a cutting edge 676 is formed, which in comparison to the previously described embodiments is again more effective in removing trapped dosage material. However, care must be taken that the opposing stop is not worn away and destroyed. The embodiment should not be interpreted as implying the limitation that there could be only one groove.

Of course, a configuration with several grooves is also possible.

FIG. 6d illustrates a possible embodiment of an opposing stop 695 on a housing 633, with only a fragment of the housing 633 being shown in the drawing. The opposing stop 695 has a recess 686. Due to the fact that only one recess 686 is formed on the opposing stop 695, the limiting stop 641 of the closure shaft 635, whose contact surface is reduced by the milled-away portions 671 in accordance with FIG. 6a can never fall into the recess 686 and thereby block the rotation of the closure shaft 635. Of course, there could also be several recesses 686 formed on the opposing stop 695; the only conditions are that the permissible surface pressure between the limiting stop 641 and the opposing stop 695 is taken into account and the circular division of the recesses 686 does not coincide with the circular division of the milled-away portions 671.

Figure 7:
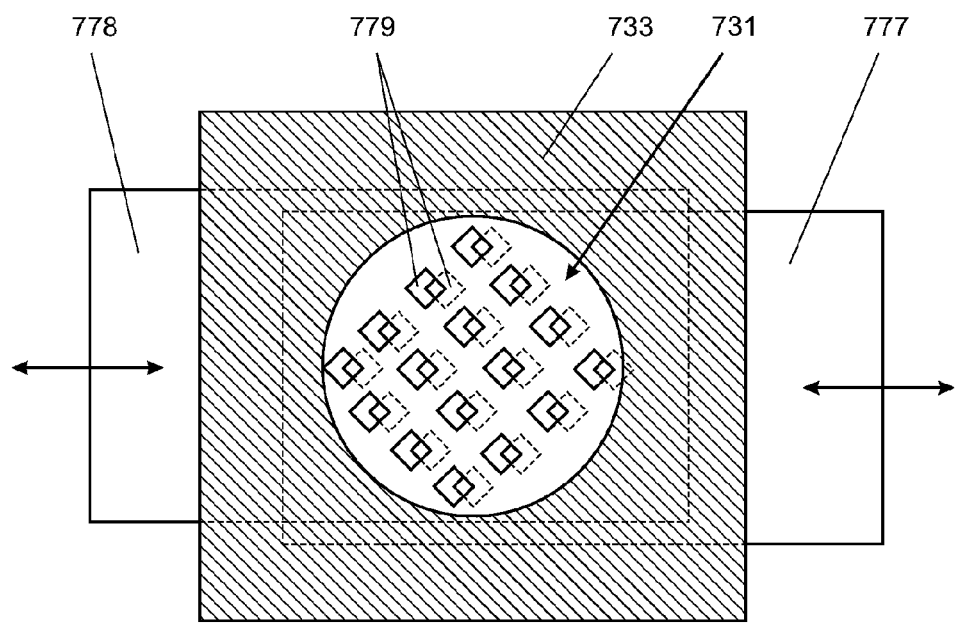
FIG. 7 shows the feeder chute in a plane section perpendicular to the central longitudinal axis of the feeder chute, wherein two sieve inserts which are arranged close together are constrained in the housing with the freedom to slide relative to each other and wherein their perforations are located essentially within the feeder chute.

FIG. 7 shows a feeder chute 731 in a sectional plane through a housing 733. The sectional plane selected in this representation is perpendicular to the central longitudinal axis of the feeder chute 731. As previously described in detail in the context of FIG. 3, the feeder chute can be equipped with sieve inserts. To avoid the need for several inserts, one can also use an arrangement where a first sieve insert 777 and a second sieve insert 778 are overlaid on each other and are supported in the housing 733 with the freedom to slide relative to each other. Their perforations 779 are located essentially within the feeder chute 731. By sliding the sieve inserts 777, 778 relative to each other, the individual perforations are partially closed. In the position where the perforations 779 completely coincide with each other, dosage material particles of the maximum size compatible with the perforation aperture will pass through the sieve inserts 777, 778 to the outlet opening, while in the completely closed position of the perforations 779, the sieve inserts 777, 778 serve as a shutter element. Both of the sieve inserts 777, 778 shown in FIG. 7 can slide in a straight line relative to the housing 733. Thus, the two sieve inserts 777, 778 can be taken out and cleaned. However, it is also possible that the first sieve insert 777 is rigidly connected to the housing and only the second sieve insert 778 is free to slide in a straight line. Of course, solutions where the first sieve insert 777 can be rotated or swiveled relative to the second sieve insert 778 about a point of rotation are also covered by this facet of the invention.

Of course, the different embodiment described in FIGS. 1 to 7 can be combined with each other. It is also possible to combine the different embodiments of recesses, scraping edges, cutting edges, peeling edges and grooves with each other, and any of them can be formed on the limit stop as well as on the opposing stop. Other surface topographies on the limit stop and/or the opposing stop, whereby dosage material is moved in the same way out of the space between the limit stop and the opposing stop, are likewise part of the present invention.

What is claimed is:

1. A head for dispensing a dosage material in the form of a powder or paste from at least one source container, comprising:
  a housing which has an outlet opening, a bearing- and passage area, and at least one socket formed on, or connected to, the housing which connects the at least one source container to the dispensing head;
  a closure shaft, held in the bearing- and passage area with the freedom to rotate about and to slide along a central longitudinal axis thereof, the central longitudinal axis being located outside of the at least one socket, said closure shaft being connected to a closure element, with a closure portion, arranged in the area of the outlet opening, and the at least one source container, in its spatial arrangement in the operating state, is arranged at least partially to the side of the closure shaft;
  at least one feeder chute formed inside the housing to connect the at least one socket to the outlet opening, each said feeder chute having a central longitudinal axis that is arranged at an acute angle α to the closure shaft central longitudinal axis with the apex of the angle α being directed downward in the operating state;
  a spring, seated in the housing, to force-bias the closure shaft and hold the closure element in the closed position;
  a limit stop of the closure shaft restricting the displacement of the closure shaft along the central longitudinal axis;
  an opposing stop, formed in the feeder chute and defining a closed position in which the limit stop rests in direct contact against the opposing stop and the outlet opening is closed off by the closure portion; and
  means for removing dosage material, formed on at least one of: the limit stop and the opposing stop.

2. The dispensing head of claim 1, further comprising:
  at least one seal ring is arranged in the bearing- and passage area, said seal ring being free to float in the radial direction relative to the housing and embracing the closure shaft with a sliding contact.

3. The dispensing head of claim 2; further comprising:
  a stirrer device connected to the closure shaft; and
  a cavity, formed inside the housing, between the outlet opening and the feeder chute, the cavity having a rotational symmetry relative to the closure shaft central longitudinal axis to accommodate the stirrer device.

4. The dispensing head according to claim 3, further comprising:
a stirrer blade set on the stirrer device so that an orbit thereof about the closure shaft central longitudinal axis passes by the feeder chute and shaves off the dosage material of pulverous or pasty consistency which enters from the feeder chute into the cavity, moving the dosage material towards at least one of: the central longitudinal axis and the outlet opening.

5. The dispensing head of claim 1, further comprising:
a shutter element of the at least one feeder chute which can be actuated from the outside.

6. The dispensing head of claim 1, further comprising:—
a gas supply port in the housing and connected by way of a gas-permeable connection to the feeder chute.

7. The dispensing head of claim 6, further comprising:
an additional hollow space, filled with a moisture-absorbing substance and connected with a gas-permeable connection to the feeder chute.

8. The dispensing head of claim 1, further comprising:
a constriction of the at least one feeder chute that serves to influence the flow velocity of the dosage material.

9. The dispensing head of claim 8, further comprising:
a sieve insert of the at least one feeder chute.

10. The dispensing head of claim 9, comprising:
at least two sieve inserts which are arranged adjacent to each other and are capable of being rotated, swiveled, or displaced in a linear movement relative to each other.

11. The dispensing head of claim 1, wherein:
sockets of different configurations are connected to the housing as adapters for source containers with differently dimensioned connections.

12. The dispensing head of claim 3, further comprising: a second stirrer device in the source container.

13. The dispensing head of claim 1, wherein:
the source container comprises a tubular body, at whose first opening a fastening flange is formed which fits the at least one socket, and whose second opening can be closed with a closure cap.

14. The dispensing head of claim 1, further comprising:
a means for identifying at least one of the dispensing head and the source container; and
a read/write device which is arranged in separation from the source container and the dispensing head.

15. The dispensing head according to claim 14, further comprising:
an outer part of the housing; and
an insert unit, with at least the bearing- and passage area formed at said insert unit, the insert unit comprising the closure shaft, the closure element, and, optionally, the stirrer device, and the identifying means.

16. Dosage-dispensing device for dosage material in the form of a powder or paste, comprising:
a drive mechanism, having a drive shaft; and
a dispensing head according to claim 1, the closure shaft thereof coupled by way of a clutch to the drive shaft.

17. The dosage dispensing device of claim 16, further comprising:
a stirrer device connected to the closure shaft; and
a cavity is formed inside the housing, between the outlet opening and the feeder chute, the cavity having a rotational symmetry relative to the closure shaft central longitudinal axis to accommodate the stirrer device.

* * * * *